United States Patent
Liu et al.

(10) Patent No.: US 11,225,597 B2
(45) Date of Patent: Jan. 18, 2022

(54) POLYMER-MONODISPERSED NANO-MICROSPHERES FOR DEEP PROFILE CONTROL AND FLOODING, AND PREPARATION METHOD THEREOF

(71) Applicant: Southwest Petroleum University, Chengdu (CN)

(72) Inventors: Rui Liu, Chengdu (CN); Wanfen Pu, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/764,559

(22) PCT Filed: Jul. 3, 2019

(86) PCT No.: PCT/CN2019/094595
§ 371 (c)(1),
(2) Date: May 15, 2020

(87) PCT Pub. No.: WO2020/248310
PCT Pub. Date: Dec. 17, 2020

(65) Prior Publication Data
US 2021/0189220 A1    Jun. 24, 2021

(30) Foreign Application Priority Data
Jun. 14, 2019    (CN) .......................... 201910515021.X

(51) Int. Cl.
*C09K 8/588* (2006.01)
*C09K 8/516* (2006.01)
*B01J 13/10* (2006.01)
*C09K 8/508* (2006.01)

(52) U.S. Cl.
CPC .............. *C09K 8/516* (2013.01); *B01J 13/10* (2013.01); *C09K 8/5086* (2013.01); *C09K 8/588* (2013.01); *C09K 2208/10* (2013.01)

(58) Field of Classification Search
CPC ...... C09K 8/516; C09K 8/5086; C09K 8/588; C09K 2208/10; C09K 8/508; B01J 13/10
See application file for complete search history.

(56) References Cited

U.S. PATENT DOCUMENTS

2014/0336040 A1*    11/2014    Yan .................... C08G 73/02
502/159

FOREIGN PATENT DOCUMENTS

| CA | 2148968 A1 | 11/1996 |
|---|---|---|
| CN | 1278545 A | 1/2001 |
| CN | 101619118 A | 1/2010 |
| CN | 102286274 A | 12/2011 |
| CN | 102432736 | * 5/2012 |
| CN | 102533233 A | 7/2012 |
| CN | 102533233 | * 11/2014 |
| CN | 106467733 A | 3/2017 |
| CN | 106634910 A | 5/2017 |

OTHER PUBLICATIONS

Translation of the International Search Report for PCT/CN2019/094595 dated Mar. 12, 2020.
Xiong C. et al. "Technologies of water shut-off and profile control: An overview" In: Petroleum Exploration and Development, 2007, vol. 34 No. 1, pp. 83-88.
Lili ,Lin, et al. "Preparation of Cross-linked Polymer Microspheres for Deep Profile Control and Flooding by Dispersion Polymerization" In: Oilfield Chemistry, Sep. 25, 2014, vol. 31, No. 3, pp. 361-399.
Changchun, Yang et al. "Performance Evaluation of Temperature- and Salt-resistant Polymer Microspheres" In: Oilfield Chemistry, Jun. 25, 2016, vol. 33, No. 2, pp. 254-260.
Shanshan, Dai et al. "The Synthesis of Cross-linked Core-shell Type Microspheres and Study of its Structure and Property" In: Applied Chemical Industry, Nov. 2017, vol. 46, No. 11, pp. 2094-2098.
Hong, Chen et al. "Preparation of PLGA Microspheres by Microfluidic Method" In: Modern Chemical Industry, Jan. 2018, vol. 38, No. 1, pp. 129-132.
Yuanyuan, Wang et al. "Preparation and Characterization of Poly (N-Isopropylacryamide-co-Methacrylic Acid) Hydrogel Microspheres by Microfluidic Method" In: Journal of Donghua University (Natural Science Edition), Feb. 2018, vol. 44, No. 01, pp. 93-99.

(Continued)

*Primary Examiner* — Kumar R Bhushan
(74) *Attorney, Agent, or Firm* — Pearne & Gordon LLP

(57) ABSTRACT

Polymer-monodispersed nano-microspheres for deep profile control and flooding. The polymer-monodispersed nano-microspheres comprise (% wt.): 0.05 to 2.5% of macromolecules A, 0.05 to 2.5% of macromolecules B, 0.002 to 0.05% of an oxygen scavenger, and mineralized water. Macromolecules A comprise a straight-chain water-soluble polymer with an ethyl ether or propyl ether structure. Macromolecules B comprise a water-soluble polymer with a hydroxyl or polyphenolic structure. Macromolecules A and macromolecules B are intermolecularly assembled under the drive of extremely strong hydrogen bonds in aqueous solutions to rapidly construct monodispersed nano-microsphere dispersion glue with a controllable size. The monodispersed nano-microspheres have a good seepage in a porous medium and excellent deep profile control and flooding capabilities.

8 Claims, 4 Drawing Sheets

(56) References Cited

OTHER PUBLICATIONS

Choi, S.K. et al. "Nanofluid enhanced oil recovery using hydrophobically associative zwitterionic polymer-coated silica nanoparticles" In: Energy & Fuels, 2017, vol. 31, No. 8, pp. 7777-7782.
International Search Report for PCT/CN2019/094595 dated Mar. 12, 2020.

* cited by examiner

POLYMER-MONODISPERSED NANO-MICROSPHERES FOR DEEP PROFILE CONTROL AND FLOODING, AND PREPARATION METHOD THEREOF

CROSS-REFERENCE TO RELATED APPLICATIONS

This is a National Stage application of PCT international application PCT/CN2019/094595, filed on Jul. 3, 2019, which claims the priority of Chinese Patent Application No. 201910515021X, filed Jun. 14, 2019, both of which are incorporated herein by reference in their entirety.

TECHNICAL FIELD

The present invention relates to polymer-monodispersed nano-microspheres for deep profile control and flooding, and preparation method thereof, belonging to the fields of colloid and interface chemistry and oilfield chemistry.

BACKGROUND ART

After natural energy extraction, the vast majority of oil reservoirs have entered a water-flooding stage. It can be said that water-flooding development is the main technology of oilfield development at present and in the future for a long time. In the process of water-flooding development, the contradiction between profile and plane is prominent due to the influence of formation heterogeneity. The injection water is propelled along a high-permeability zone, resulting in low swept extent of water flooding and great difficulty in stable production. To this end, the injection of chemical systems into an injection well for profile control and flooding of a reservoir to promote fluid flow diversion is the key to expand a swept coefficient of the injection water and increase a crude oil recovery rate.

Commonly used profile control and flooding systems include foam, weak gel, jelly dispersion glue, colloidal dispersion glue, pre-crosslinked particles and microspheres (Xiong C, Tang X. Technologies of water shut-off and profile control: An overview [J]. Shiyou Kantan Yu Kaifa (Petroleum Exploration and Development), 2007, 34 (1): 83-88). In the early 1980s, Okubo proposed the concept of "particle design". Polymer microspheres are polymer particles having a spherical shape and a particle size in the range of tens of nanometers to hundreds of microns. The polymer microspheres have high permeability and flowability. The polymer microspheres on the surfaces of different functional groups can be reflected in practical application through controlled polymerization, so the polymer microspheres have high designability, temperature resistance and salt resistance, intelligent response and fluidity regulation performance, and have a broad application prospect in deep profile control and flooding of an oil reservoir. The polymer microspheres are mainly prepared from small-sized emulsion droplets as microreactors by means of inverse emulsion polymerization (Lin Lili, Zheng Xiaoyu, Liu Kecheng, et al. Preparation of Cross-linked Polymer Microspheres for Deep Profile Control and Flooding by Dispersion Polymerization [J]. Oilfield Chemistry, 2014, 3: 011). Some scholars have synthesized a copolymer microsphere (PAMAS) that can swell with water by using an emulsifier by means of an inverse emulsion method. This microsphere has a good moving effect and greatly improves the recovery efficiency (Ma Guoyan, Shen Yiding, Gao Ruimin, et al. Research on Application Performance of Nano-micrometer Acrylamide Microsphere Profile Control Agent [J]. Modern Chemical Industry, 2016, 36 (12): 94-96).

The application technology of polymer microsphere profile control and water shutoff is a new technology developed in recent years. Yang Changchun, et al., used polymer microspheres to perform deep profile water shutoff for an oil reservoir (Yang Changchun, Yue Xiangan, Zhou Daiyu, et al. Performance Evaluation of Temperature- and Salt-resistant Polymer Microspheres [J]. Oilfield Chemistry, 2016, 33 (02): 254-260). Dai Shanshan et al., produced a cross-linked core-shell microsphere by an inverse emulsion method. This microspheres had good adsorption when treating oilfield wastewater, which demonstrated high efficiency of this microsphere to adsorb oil in wastewater (Dai Shanshan, Chen Zhencong, Huang Zhiyu. Synthesis of Cross-linked Core-shell Microspheres and Researches on Their Structure and Properties [J]. Applied Chemical Industry, 2017, 46 (11): 2094-2098). Chen Hong et al., successfully prepared methyl methacrylate (MMA)/styrene (St) copolymerized microspheres from a photoinitiator by means of a microfluidic method. This technology can affect the mass transfer of water molecules in an oil phase by controlling the content of an emulsifier in the reaction, and finally achieve microscopic control of the microspheres (Chen Hong, Xu Jumei, Zhao Shicheng, et al. Preparation of PLGA Microspheres by Microfluidic Method and Researches on Their Properties [J]. Modern Chemical Industry, 2018, 38 (01): 129-132). Wang Yuanyuan, et al., used a microfluidic method to produce microspheres. By adjusting the flow rate of a continuous phase/dispersed phase and the ratio of a surfactant, the microscopic size and pore structure of the microspheres can be effectively controlled, and the changes in the temperature of the environment and pH can also affect the volume of the microspheres (Wang Yuanyuan, Qiu Yisheng, Ma Jinghong, et al. Preparation of P(NIPA-co-MAA) Hydrogel Microspheres by Microfluidic Method and Their Property Characterization [J]. Journal of Donghua University (Natural Science Edition), 2018, 44 (01): 93-99). Choi et al., prepared nano-silica nanospheres modified by molecular chains of an amphiphilic polymer by using a surface click activity-controlled free radical polymerization method. These nanospheres have a good migration performance and heterogeneity control performance in porous media, which can effectively increase the recovery rate of crude oil after water flooding (Choi S K, Son H A, Kim H T, et al. Nanofluid enhanced oil recovery using hydrophobically associative zwitterionic polymer-coated silica nanoparticles [J] Energy & Fuels, 2017, 31(8): 7777-7782).

Polymer microspheres are of a nano-micro-scale dispersion formed by ground polymerization-crosslinking. In addition to polymerized monomers, initiators, crosslinking agents and large amounts of emulsifiers, oil phases or organic solvents are required, resulting in high cost and relatively harsh preparation conditions. Therefore, how to achieve low-carbon, environment friendliness, energy saving, simple and efficient preparation of polymer microspheres, and to achieve deep processing is a major challenge for profile control and flooding with microspheres.

SUMMARY OF THE INVENTION

An object of the present invention is to provide polymer monodispersed nano-microspheres for deep profile control and flooding. The monodispersed nano-microspheres have good seepage in porous media and excellent deep profile control and flooding capabilities, can greatly improve the sweep efficiency, significantly improve the recovery rate of a high water cut oilfield, and effectively drive the efficient development of a water-flooding oil reservoir, is easily available in raw materials, and has a broad industrial application prospect.

Another object of the present invention is to provide a preparation method of the polymer-monodispersed nano-microspheres for deep profile control and flooding. This method is reliable in principle, simple and easy to implement, efficient and fast, without any initiator, cross-linking agent, emulsifier, oil phase and auxiliary devices, and environment-friendly, has very obvious advantages in energy saving and emission reduction, can achieve deep profile control and flooding of an oil reservoir, and has a broad application prospect and outstanding economic benefits.

To fulfill the above technical object, the present invention adopts the following technical solutions.

The present invention is based on the supramolecular theory, with a straight-chain water-soluble polymer with an ethyl ether or propyl ether structure (referred to as macromolecules A) as a hydrogen acceptor, and a water-soluble polymer with a polyhydroxyl or polyphenolic structure (referred to as macromolecules B) as a hydrogen donor. Aqueous solutions of the macromolecules A and the macromolecules B generate a strong supramolecular hydrogen bonding effect instantaneously in the mixing process, and the macromolecules A and the macromolecules B are intermolecularly assembled under the drive of extremely strong hydrogen bonds to rapidly construct monodispersed nano-microsphere dispersion glue with a controllable size.

Polymer-monodispersed nano-microspheres for deep profile control and flooding comprise the following components in percentage by weight:

| | |
|---|---|
| macromolecules A | 0.05-2.5%; |
| macromolecules B | 0.05-2.5%; |
| Oxygen scavenger | 0.002-0.05%; | and the balance of mineralized water.

The macromolecules A are of a straight-chain water-soluble polymer with an ethyl ether or propyl ether structure.

The macromolecules A are polypropylene glycol, fatty alcohol polyoxyethylene ether, methallyl alcohol polyoxyethylene ether or allyl alcohol polyoxyethylene ether.

The polypropylene glycol has a molecular structural formula as follows:

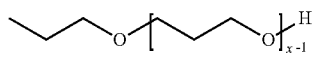

in which, x is the polymerization degree.

The fatty alcohol polyoxyethylene ether, methallyl alcohol polyoxyethylene ether or allyl alcohol polyoxyethylene ether has a molecular structural formula as follows:

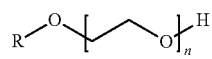

in which, R is an alkyl chain —$(CH_2)_n CH_3$ (fatty alcohol polyoxyethylene ether), —$CH=CHCH_3$ (methallyl alcohol polyoxyethylene ether) or —$CH=CH_2$ (allyl alcohol polyoxyethylene ether); n is the polymerization degree.

The macromolecules B are a water-soluble polymer with a polyhydroxyl or polyphenolic structure.

The macromolecules B are carboxymethyl-β-cyclodextrin, tannin extract or tea polyphenol.

The carboxymethyl-β-cyclodextrin has a molecular structural formula as follows:

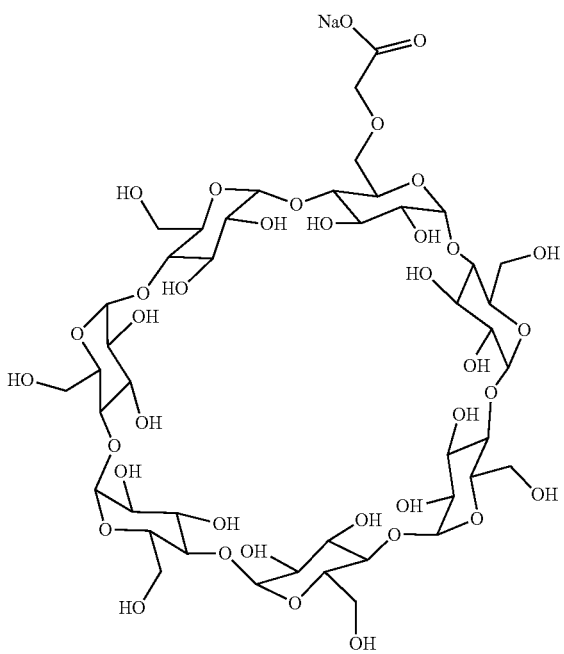

The tannin extract has a molecular structural formula as follows:

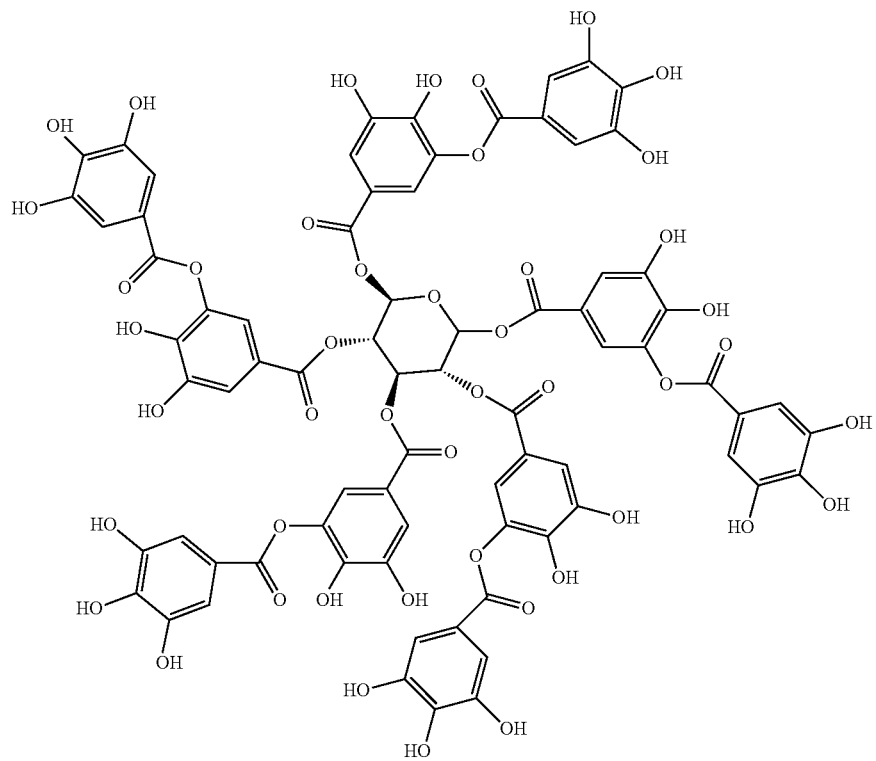 [SMILES: O=C(Oc1cc(C(=O)OC2O[C@H](OC(=O)c3cc(O)c(O)c(OC(=O)c4cc(O)c(O)c(O)c4)c3)[C@@H](OC(=O)c3cc(O)c(O)c(OC(=O)c4cc(O)c(O)c(O)c4)c3)[C@H](OC(=O)c3cc(O)c(O)c(OC(=O)c4cc(O)c(O)c(O)c4)c3)[C@H]2OC(=O)c2cc(O)c(O)c(OC(=O)c3cc(O)c(O)c(O)c3)c2)cc(O)c1O)c1cc(O)c(O)c(O)c1]

The tea polyphenol has a molecular structural formula as follows:

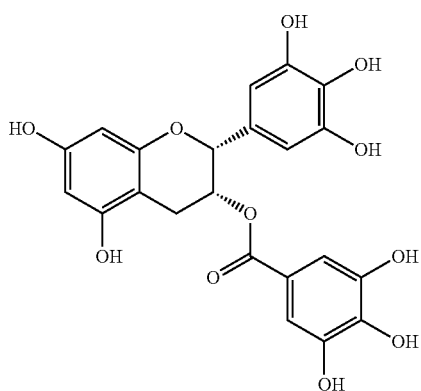 [SMILES: O=C(O[C@@H]1Cc2c(O)cc(O)cc2O[C@@H]1c1cc(O)c(O)c(O)c1)c1cc(O)c(O)c(O)c1]

The oxygen scavenger is thiourea.

A preparation method for the polymer-monodispersed nano-microspheres for deep profile control and flooding sequentially comprises the following steps:

(1) adding a certain amount of oxygen scavenger to mineralized water and stirring to dissolve for 10~20 minutes, and then dividing the mixture into two parts;

(2) adding a certain mass concentration of macromolecules A to one part of mineralized water, and stirring to dissolve at room temperature for 10~30 minutes;

(3) adding a certain mass concentration of macromolecules B to the other part of mineralized water, and stirring to dissolve at room temperature for 10~30 minutes; and (4) mixing the macromolecule A solution and the macromolecule B solution, and constructing the two types of water-soluble polymers under the drive of hydrogen bonds to obtain the monodispersed nano-microspheres.

The polymer-monodispersed nano-microspheres for deep profile control and flooding are of a monodispersed nano-micro-scale spherical dispersion glue which is constructed in such a manner: aqueous solutions of the macromolecules A and the macromolecules B are intermolecularly assembled under the drive of a strong supramolecular hydrogen bonding effect in the mixing (contact) process. The monodispersed nano-microspheres involves 4 types of macromolecules A and 3 types of macromolecules B, wherein the macromolecules A and macromolecules B are intermolecularly assembled, so there are 12 types of molecular structures of the monodispersed nano-microspheres. The present invention aims to provide exemplary structures.

(1) The monodispersed nano-microsphere constructed with polypropylene glycol and tea polyphenol has a structure as follows:

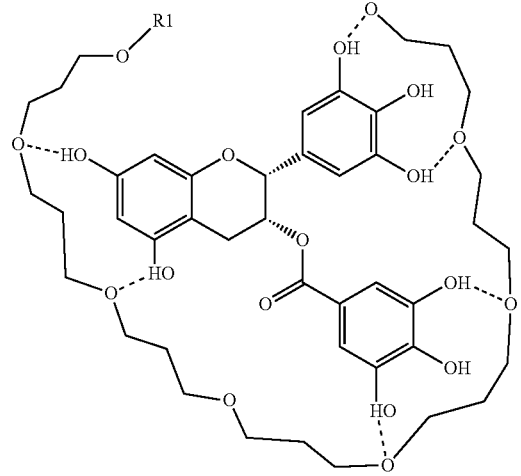

in which, R1 is —$(CH_2CH_2CH_2O)_a$H.

(2) The monodispersed nano-microsphere constructed with allyl alcohol polyoxyethylene ether and carboxymethyl-β-cyclodextrin has a structure as follows:

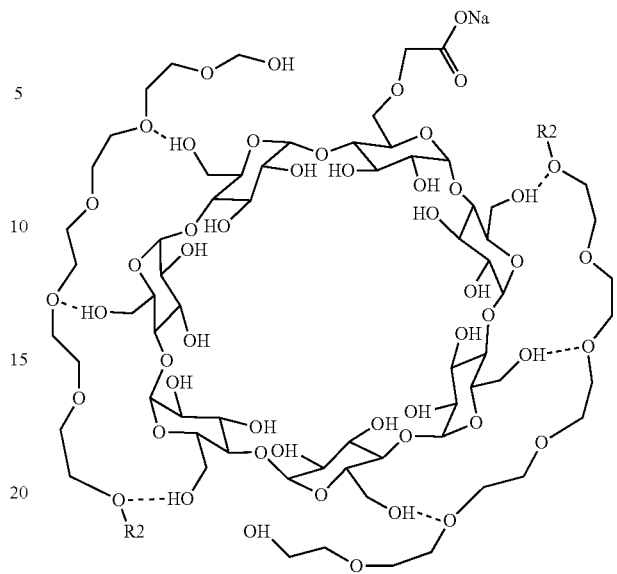

in which, R2 is —$(CH_2CH_2O)_b(CH_2)_d$CH=$CH_2$.

(3) The monodispersed nano-microsphere constructed with fatty alcohol polyoxyethylene ether and tannin extract has a structure as follows:

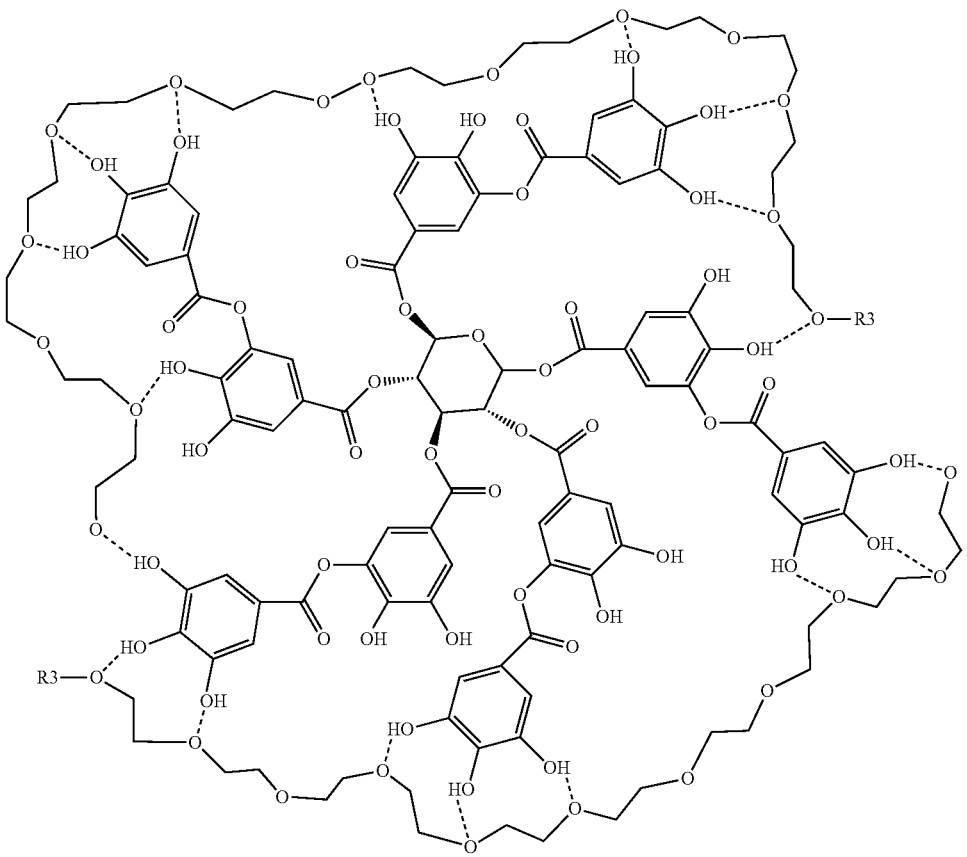

In which, R3 is —$(CH_2CH_2O)_b(CH_2)_d$CH$_3$.

The above substances are all commercially available.

The monodispersed nano-microspheres comprise the following components in percentage by weight: preferably 0.5% of the macromolecules A, preferably 0.5% of the macromolecules B, preferably 0.01% of the oxygen scavenger, and the balance of mineralized water.

The construction mechanism of the monodispersed nano-microspheres is as follows: (1) the macromolecules A and B are water-soluble macromolecules, wherein the macromolecules A serve as a hydrogen acceptor, the macromolecules B serve as a hydrogen donor, and the macromolecules A and B are macromolecules that are coordinated to each other by hydrogen bonds, and have an extremely strong hydrogen bonding effect; (2) in the process of mutual contact of macromolecules A and B in an aqueous solution, A and B have a very strong supramolecular hydrogen bonding effect, and the hydrogen bonds drive the macromolecules A and B to be assembled to quickly form nano-microspheres; and (3) the scale (particle size) of the nano-microspheres is mainly controlled by the type and molecular weight of the macromolecules A and the type of the macromolecules B, and the scale control of the monodispersed nano-microspheres can be achieved by selecting the type and molecular weight of the macromolecules A and the type of the macromolecules B.

The profile control and flooding mechanism of the monodispersed nano-microspheres is as follows: the monodispersed nano-microspheres have a viscosity slightly higher than that of mineralized water, have good seepage in porous media, preferentially enter a high permeability area, and expand slowly under oil reservoir conditions (temperature, mineralization degree), thereby significantly improving a fluid absorption profile of a formation, achieving deep intelligent profile control and flooding, and greatly increasing the crude oil recovery rate.

Compared with the prior art, the present invention has the following beneficial effects:

(1) the macromolecules A are low in cost and rich in raw materials;

(2) the macromolecules B are natural organic macromolecules with rich sources, low price, and environmental protection;

(3) the macromolecules A and B are directly dissolved in mineralized water, and the dissolution time is less than 30 minutes;

(4) the aqueous solutions of the macromolecules A and B form kinetic and thermodynamically stable monodispersed nano-microspheres at the moment of mixing (contact), without any initiator, emulsifier and cross-linking agent and stirring equipment, heating equipment and reaction equipment; no by-product is generated in the whole process, thereby being efficient and fast, and environmentally friendly; and the advantages of energy saving and emission reduction are very obvious;

(5) the monodispersed nano-microspheres have strong controllability in particle size and are simple and easy to implement; and (6) the monodispersed nano-microspheres are suitable for an oil reservoir with a temperatures up to 120° C. and a water mineralization degree up to $20\times10^4$ mg/L, cover a wide range of oil reservoirs, can achieve deep profile control and flooding of the oil reservoir, and significantly extend the validity and greatly improves the sweep efficiency.

DETAILED DESCRIPTION

The present invention is further described below with reference to the accompanying drawings and examples, for those skilled in the art to understand the present invention. However, it should be clear that the present invention is not limited to the scope of the specific embodiments. To those of ordinary skill in the art, as long as various changes are within the spirit and scope of the present invention as defined and determined by the appended claims, they are all protected.

Preparation of monodispersed nano-microspheres comprises the following steps:

preparing mineralized water (deionized water) with a mineralization degree of $0\sim20\times10^4$ mg/L in percentage by weight and stirring for 10~60 minutes, and adding 0.01% of thiourea to 99.49% of mineralized water (deionized water) and stirring for 5~10 minutes; dividing the prepared mineralized water into two parts; adding 0.5% of macromolecules A to one part of mineralized water, adding 0.5% of macromolecules B to the other part of mineralized water, and stirring for 10~30 minutes to ensure that the macromolecules A and B are sufficiently dissolved; and mixing the macromolecule A solution and the macromolecule B solution to obtain the monodispersed nano-microspheres.

Embodiment 1 Structural Characterization of Monodispersed Nano-Microspheres

Figure 1:
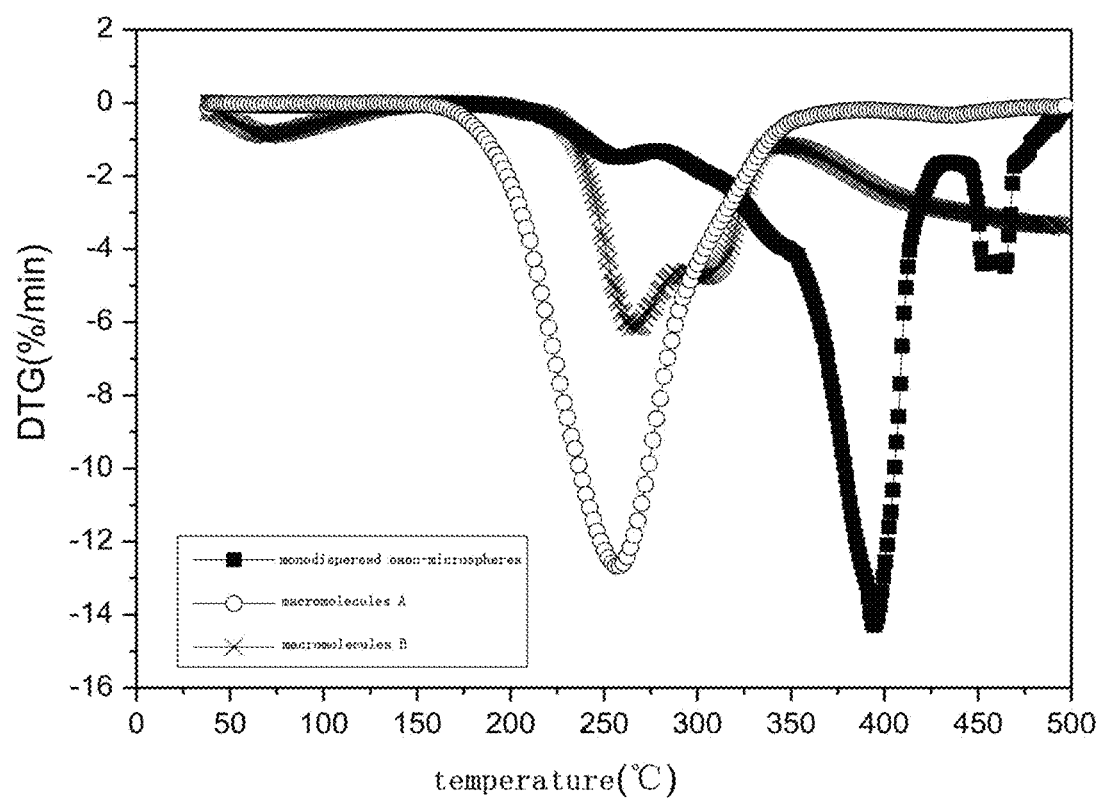
FIG. 1 is an exploded thermogravimetric diagram of monodispersed nano-microspheres.

Two parts of deionized water in the same mass are taken and numbered 1 #-1 and 1 #-2, 2 #-1 and 2 #-2, 3 #-1 and 3 #-2, 4 #-1 and 4 #-2, respectively; 0.5% of fatty alcohol polyoxyethylene ether is added to 1 #-1, and 0.5% of tannin extract is added to 1 #-2; 0.5% of polypropylene glycol is added to 2 #-1, and 0.5% of tea polyphenol is added to 2 #-2; 0.5% of methallyl alcohol polyoxyethylene ether is added to 3 #-1, and 0.5% of carboxymethyl-β-cyclodextrin is added to 3 #-2; 0.5% of allyl alcohol polyoxyethylene ether is added to 4 #-1, and 0.5% of tannin extract is added to 4 #-2; and the mixtures are stirred for 15 minutes, respectively. 1 #-1, 2 #-1, 3 #-1, and 4 #-1 solutions are respectively mixed with 1 #-2, 2 #-2, 3 #-2, and 4 #-2 solutions to construct monodispersed nano-microspheres numbered 1&, 2&, 3& and 4&. A thermogravimetric analyzer is used to characterize the structures of the monodispersed nano-microspheres. FIG. 1 is an exploded thermogravimetric curve of 1&. It can be found that a thermogravimetric decomposition temperature of the nano-microspheres constructed by A and B under the drive of super strong hydrogen bonds is significantly higher than that of macromolecules A and B, which demonstrates that the monodispersed nano-microspheres are not a simple physical mixture of macromolecules A and B, but rather a thermodynamically stable structure formed by the super-hydrogen bonding effect.

Embodiment 2 Microgram of Monodispersed Nano-Microspheres

Figure 2:
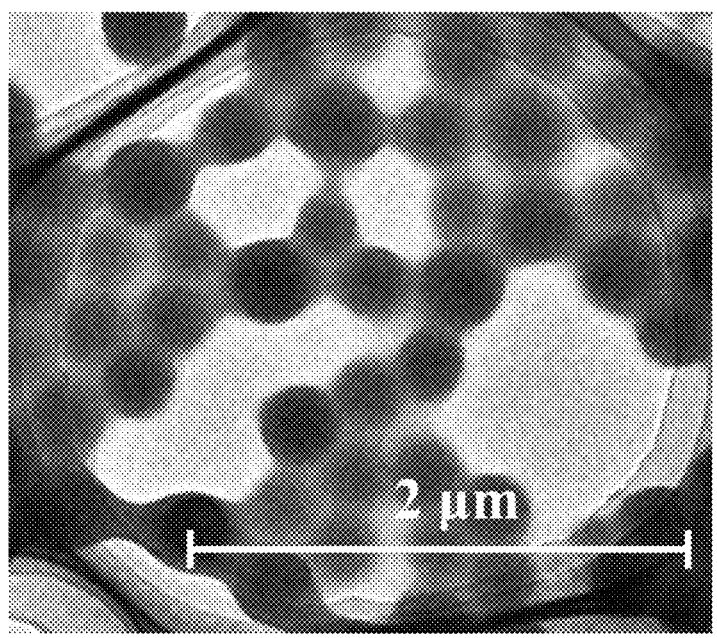
FIG. 2 is a micrograph of the monodispersed nano-microspheres in a dried state.
Figure 3:
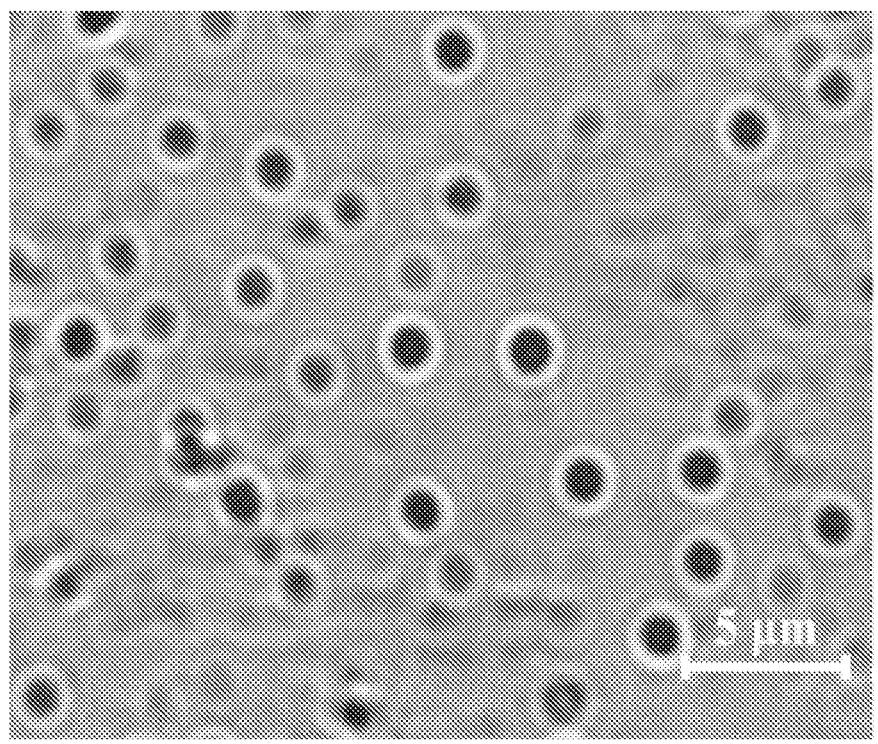
FIG. 3 is a micrograph of the monodispersed nano-microspheres in a hydrated state.

Deionized water is prepared and numbered 1 #, mineralized water 2 # with a mineralization degree of $0.1\times10^4$ mg/L, mineralized water 3 # with a mineralization degree of $5\times10^4$ mg/L, mineralized water 4 # with a mineralization degree of $10\times10^4$ mg/L, and mineralized water 5 # with a mineralization degree of $20\times10^4$ mg/L (the concentration of $Ca^{2+}$ and $Mg^{2+}$ in 2 # to 5 # is 5% of the total mineralization degree) are prepared and stirred for 30 minutes; and 0.01% of thiourea is added into 99.49% of mineralized water (deionized water) and stirred for 5 minutes. Two parts of deionized water in mass are taken and numbered 1 #-1, 1 #-2, and two parts of mineralized water 2 #-1 and 2 #-2, 3 #-1 and 3 #-2, 4 #-1 and 4 #-2, 5-1 # and 5-2 # are taken, respectively; 0.5% of fatty alcohol polyoxyethylene ether is added to 1 #-1, and 0.5% of tannin extract is added to 1 #-2; 0.5% of polypropylene glycol is added to 2 #-1, and 0.5% of tea polyphenol is added to 2 #-2; 0.5% of methallyl alcohol polyoxyethylene ether is added to 3 #-1, and 0.5% of carboxymethyl-β-cyclodextrin is added to 3 #-2; 0.5% of allyl alcohol polyoxyethylene ether is added to 4 #-1, and 0.5% of tannin extract is added to 4 #-2; 0.5% of fatty alcohol polyoxyethylene ether is added to 5 #-1, and 0.5% of tannin extract is added to 5 #-2; the mixtures are stirred for 20 minutes respectively; and 1 #-1, 2 #-1, 3 #-1, 4 #-1, and 5 #-1 solutions are respectively mixed with 1 #-2, 2 #-2, 3 #-2, 4 #-2, and 5 #-2 solutions to construct monodispersed nano-microspheres numbered 1*, 2*, 3*, 4*, 5*. A transmission electron microscope is used to test the particle size of the nano-microspheres in a dried state. The dried nano-microspheres are monodispersed and the particle size distribution is 200 nm~3.0 μm; the 1* nano-microspheres are shown in FIG. 2 and the nano-microspheres have a particle size of about 300 nm. An optical microscope is used to analyze the micro-morphology and particle size of (mineralized) hydrated nano-microspheres, wherein the (mineralized) hydrated nano-microspheres are evenly dispersed in a water phase without coalescence, and the (mineralized) hydrated nano-microspheres have a median diameter of 500 nm~5.0 μm; the particle size test of the 5* nano-microspheres in a hydrated state is shown in FIG. 3, with a median particle size of about 1.5 μm.

Embodiment 3 Long-Term Stability of Monodispersed Nano-Microspheres

Figure 4:
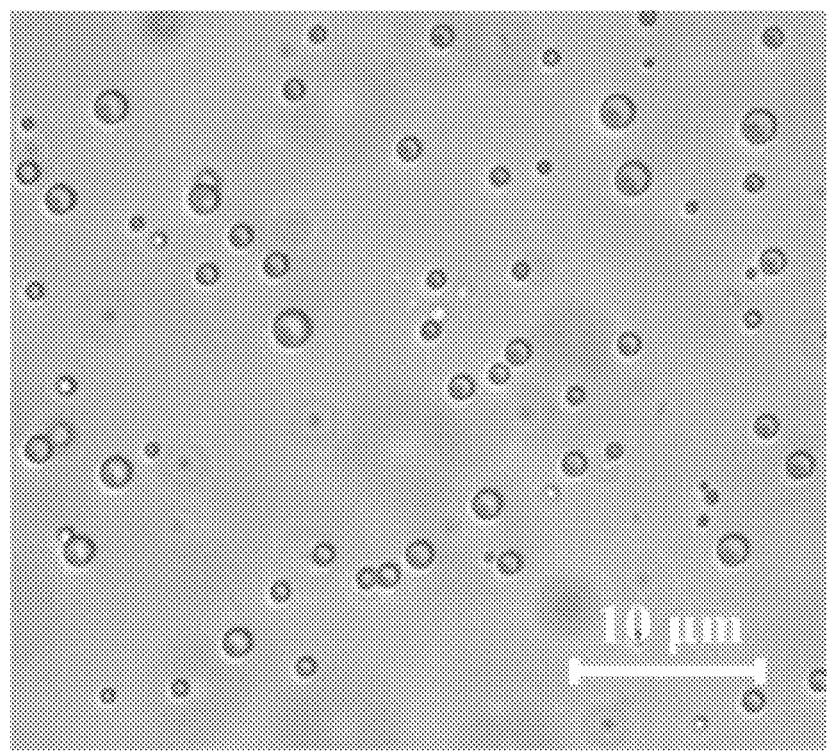
FIG. 4 is a micrograph of the monodispersed nano-microspheres after aging.

The monodispersed nano-microspheres 2*, 3*, 4* and 5* prepared according to Embodiment 2 are placed at 40° C., 80° C., 60° C., and 120° C., and aged for 90 days. The structure and morphology of the monodispersed nano-microspheres after aging are observed with an optical microscope, wherein the monodispersed nano-microspheres still maintain a stable structure, and show long-term stability in an oil reservoir temperature and mineralization degree environment. The microscopic morphology of the 2* monodispersed nano-microspheres aged at 80° C. for 90 days is shown in FIG. 4. The monodispersed nano-microspheres expand during the aging process, and the spherical structure is regular, with a median diameter of about 2.0 μm, which reflects temperature and salt resistance.

Embodiment 4 Fluid Diversion Performance of Monodispersed Nano-Microspheres

According to the monodispersed nano-microspheres 2*, 3*, 4* and 5* prepared in Embodiment 2, the nano-microspheres are passed through 5 layers of 100-mesh screens using a displacement device at an injection rate of 0.2 ml/min. Because the monodispersed nano-microspheres are stacked on the screens after overlapping, when an injection pressure reaches a certain value, due to good elasticity of the monodispersed nano-microspheres, the monodispersed nano-microspheres start to pass through multiple layers of screens, and the corresponding pressure at this time is called a diversion pressure. The diversion pressure of the monodispersed nano-microspheres is shown in Table 1. The diversion pressure of the monodispersed nano-microspheres is 100~200 kPa, and is closely related to the particle size, which indicates that in mine application, the corresponding monodispersed nano-microspheres with different particle sizes can be selected according to the permeability and heterogeneity of high permeability areas of the oil reservoir. In addition, after the monodispersed nano-microspheres are passed through 5 layers of 100-mesh screens repeatedly for three times, the diversion pressures are basically the same, which indicates that the monodispersed nano-microspheres have super shear resistance, and can effectively control the high-permeability areas, promote the fluid flow to divert, increase the subsequent fluid sweep coefficient, and improve the development effect.

TABLE 1

Diversion Pressure of Monodispersed Nano-microspheres

| No. | Temperature ° C. | Diversion pressure kPa after passing the screens for the first time | Diversion pressure kPa after passing the screens for the second time | Diversion pressure kPa after passing the screens for the third time |
| --- | --- | --- | --- | --- |
| 2* | 40 | 150.2 | 144.9 | 141.8 |
| 3* | 80 | 117.3 | 114.9 | 106.2 |
| 4* | 60 | 120.1 | 113.2 | 104.5 |
| 5* | 120 | 161.9 | 151.2 | 146.7 |

Figure 5:
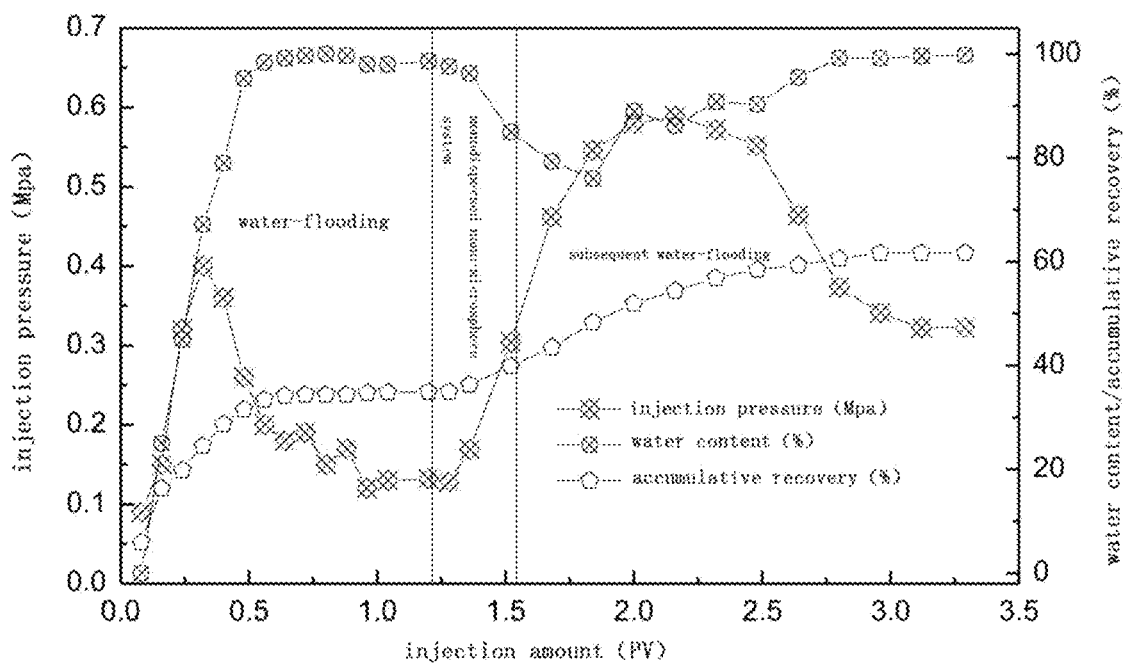
FIG. 5 is an effect diagram of profile control and flooding of the monodispersed nano-microspheres.

Embodiment 5 Crude Oil Recovery Potential Enhanced by Monodispersed Nano-Microspheres The 5* monodispersed nano-microspheres prepared in Embodiment 2 are taken for later use. One artificial double-layer heterogeneous core (a 45×45×300 mm long core, which has double layers and is heterogeneous with a gas permeability of 100 mD/500 mD, an average porosity of 21.6%, and an original oil saturation of 60.3%; the mineralization degree of injection water is $20\times10^4$ mg/L, wherein the concentration of $Ca^{2+}$ and $Mg^{2+}$ is 5% of the total mineralization degree), wherein the experimental temperature is 80° C., the viscosity of crude oil is 50.2 mPa·s, and the fixed displacement rate is 1.0 mL/min. In the water-flooding stage, affected by the unfavorable water-oil fluidity ratio, especially the heterogeneity, the water-flooding recovery level is low, and the recovery rate of crude oil having a water content of 98% is 35.3%. On this basis, the 5* monodispersed nano-microspheres with a pressure of 0.3 PV are injected, the injection pressure gradually increases, and oil is produced again, which indicates that the adsorption of the monodispersed nano-microspheres and their intelligent plugging and regulation for pore throats in high permeability areas during the migration process increase the seepage resistance in the high permeability areas, promote subsequent fluid injection into low permeability areas, adjust a liquid absorption profile, and increase the swept coefficient of fluid, thereby achieving balanced displacement in the high and low permeability areas. When water flooding is performed to reach a water content of 98%, the significantly enhanced oil recovery by the monodispersed nano-microspheres is more than 25%, the cumulative recovery is about 61%, and the effect of enhanced recovery is shown in FIG. 5.

The invention claimed is:

1. Polymer-monodispersed nano-microspheres for deep profile control and flooding, comprising, in percentage by weight:

| | |
|---|---|
| macromolecules A | 0.05-2.5%; |
| macromolecules B | 0.05-2.5%; |
| an oxygen scavenger | 0.002-0.05%; | and further comprising a balance of mineralized water, wherein macromolecules A are of a straight-chain water-soluble polymer with an ethyl ether or propyl ether structure; and macromolecules B are of a water-soluble polymer with a hydroxyl or polyphenolic structure.

2. The polymer-monodispersed nano-microspheres for deep profile control and flooding according to claim 1, wherein the macromolecules A are polypropylene glycol, fatty alcohol polyoxyethylene ether, methallyl alcohol polyoxyethylene ether or allyl alcohol polyoxyethylene ether.

3. The polymer-monodispersed nano-microspheres for deep profile control and flooding according to claim 1, wherein the macromolecules B are carboxymethyl-β-cyclodextrin, tannin extract or tea polyphenol.

4. The polymer-monodispersed nano-microspheres for deep profile control and flooding according to claim 1, wherein the oxygen scavenger is thiourea.

5. A preparation method for the polymer-monodispersed nano-microspheres for deep profile control and flooding according to claim 1, sequentially comprising the following steps:

adding a certain amount of the oxygen scavenger to the mineralized water and stirring to dissolve for 10~20 minutes to produce a mineralized water mixture, and then dividing the mineralized water mixture into two parts;

adding a certain mass concentration of the macromolecules A to a first part of the mineralized water mixture, and stirring to dissolve at room temperature for 10~30 minutes to produce a macromolecules A solution;

adding a certain mass concentration of the macromolecules B to a second part of the mineralized water mixture, and stirring to dissolve at room temperature for 10~30 minutes to produce a macromolecules B solution; and mixing the macromolecules A solution and the macromolecules B solution, and constructing two types of water-soluble polymers under the drive of hydrogen bonds to obtain the polymer monodispersed nano-microspheres.

6. A preparation method for the polymer-monodispersed nano-microspheres for deep profile control and flooding according to claim 2, sequentially comprising the following steps:

adding a certain amount of the oxygen scavenger to the mineralized water and stirring to dissolve for 10~20 minutes to produce a mineralized water mixture, and then dividing the mineralized water mixture into two parts;

adding a certain mass concentration of the macromolecules A to a first part of the mineralized water mixture, and stirring to dissolve at room temperature for 10~30 minutes to produce a macromolecules A solution;

adding a certain mass concentration of the macromolecules B to a second part of the mineralized water mixture, and stirring to dissolve at room temperature for 10~30 minutes to produce a macromolecules B solution; and mixing the macromolecules A solution and the macromolecules B solution, and constructing two types of water-soluble polymers under the drive of hydrogen bonds to obtain the polymer monodispersed nano-microspheres.

7. A preparation method for the polymer-monodispersed nano-microspheres for deep profile control and flooding according to claim 3, sequentially comprising the following steps:

adding a certain amount of the oxygen scavenger to the mineralized water and stirring to dissolve for 10~20 minutes to produce a mineralized water mixture, and then dividing the mineralized water mixture into two parts;

adding a certain mass concentration of the macromolecules A to a first part of the mineralized water mixture, and stirring to dissolve at room temperature for 10~30 minutes to produce a macromolecules A solution;

adding a certain mass concentration of the macromolecules B to a second part of the mineralized water mixture, and stirring to dissolve at room temperature for 10~30 minutes to produce a macromolecules B solution; and mixing the macromolecules A solution and the macromolecules B solution, and constructing two types of water-soluble polymers under the drive of hydrogen bonds to obtain the polymer monodispersed nano-microspheres.

8. A preparation method for the polymer-monodispersed nano-microspheres for deep profile control and flooding according to claim 4, sequentially comprising the following steps:

adding a certain amount of the oxygen scavenger to the mineralized water and stirring to dissolve for 10~20 minutes to produce a mineralized water mixture, and then dividing the mineralized water mixture into two parts;

adding a certain mass concentration of the macromolecules A to a first part of the mineralized water mixture, and stirring to dissolve at room temperature for 10~30 minutes to produce a macromolecules A solution;

adding a certain mass concentration of the macromolecules B to a second part of the mineralized water mixture, and stirring to dissolve at room temperature for 10~30 minutes to produce a macromolecules B solution; and mixing the macromolecules A solution and the macromolecules B solution, and constructing two types of water-soluble polymers under the drive of hydrogen bonds to obtain the polymer monodispersed nano-microspheres.

* * * * *